United States Patent Office 3,558,618
Patented Jan. 26, 1971

3,558,618
NOVEL 4H-PYRAZINO(1,2-a)PYRIMIDINE-4-ONES
Donald L. Trepanier, Indianapolis, Ind., assignor to The Dow Chemical Company, Midland, Mich., a corporation of Delaware
No Drawing. Filed Apr. 1, 1968, Ser. No. 717,911
Int. Cl. C07d 57/24
U.S. Cl. 260—247.2
7 Claims

ABSTRACT OF THE DISCLOSURE

This invention is directed to novel 4H-pyrazino(1,2-a)pyrimidin-4-ones, and their mineral acid salts, and to a method for their preparation. The new compounds are useful as antidepressants in animals.

SUMMARY OF THE INVENTION

The present invention is directed to 4H-pyrazino(1,2-a)pyrimidin-4-ones represented by one of the formulas

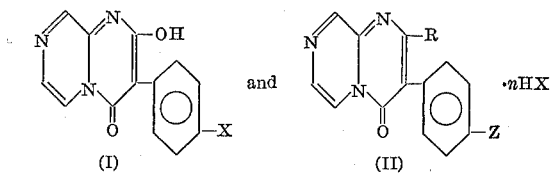

In these and succeeding formulas, Z represents hydrogen or chlorine, X represents chlorine or bromine, $n$ is zero or one, and R represents N-(lower alkyl)-3-piperidinyloxy, morpholino-loweralkoxy, di(lower alkyl)amino-loweralkoxy, cyano-loweralkoxy, carboethoxy-loweralkoxy, or N-(azacycloalkyl)-loweralkoxy. The term "lower alkyl," as employed in the present specification and claims, refers to those alkyl groups containing from 1 to 4 inclusive, carbon atoms arranged in either a straight or branched chain. The term "lower alkoxy," as employed in the present specification and claims, refers to alkoxy groups containing from 2 to 4, inclusive, carbon atoms arranged in either a straight chain or branched chain in a manner such that the oxygen atom of the alkoxy group is separated from the nitrogen atom or other functional groups such as cyano or carboethoxy, attached to the alkoxy group, by at least two carbon atoms. The term "azacycloalkyl," as employed in the present specification and claims refers to azacycloalkyl groups containing from 4 to 6 inclusive, carbon atoms formed into a ring including one nitrogen atom.

The compounds corresponding to Formula I are solids with limited solubility in common organic solvents and water. Compounds of Formula II in the free base form are oils which are generally soluble in common organic solvents such as acetone, lower alcohols, and aliphatic ethers. The products of Formula II which are mineral acid salts are soluble in water.

The 4H-pyrazino(1,2-a)pyrimidin-4-ones of this invention have central nervous system activity in animals. Such activity is demonstrated by the ability of the compounds to inhibit symptoms of depression, such as ptosis, normally elicited by dosing mice with reserpine. A further indication of central nervous system activity is found in the ability of these compounds to increase the lethality of a sub-lethal dose of $d$-amphetamine. Such types of activity as exhibited by the compounds of this invention are known to be indicative of antidepressant pharmacological activity in laboratory animals. Central nervous system activity is also evident from the effectiveness of certain of the compounds in prolonging hexobarbital sleep-time in mice.

In the preparation of the compounds of the invention corresponding to Formula I, a substituted diethyl malonate having the formula

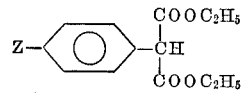

is reacted with aminopyrazine. The reactants can be mixed in any proportions and heated at a temperature of at least 160° to produce the desired products of Formula I and ethanol as a by-product.

In carrying out the reaction the reactants are mixed and contacted in any convenient manner and the resulting mixture maintained at the reaction temperature for a period of time to insure completion of the reaction. It is convenient to employ substantially equimolar amounts of the reagents in the initial stages of the reaction. One or two later additions of the substituted diethyl malonate in molar amounts equal to about one-fourth of the amount used initially increase the yield of the desired product and are thus preferred. The reaction can be run at atmospheric pressure, although it is preferred to conduct the process at pressures somewhat below atmospheric pressure to facilitate removal of the ethanol by-product, thereby driving the reaction to completion. After completion of the reaction, the solid product obtained can be purified by washing with an organic solvent such as an aliphatic ether to remove any unreacted starting materials, and the product can be further purified by conventional procedures such as recrystallization if desired.

In the preparation of the compounds of the invention corresponding to Formula II, a 4H-pyrazino(1,2-a)pyrimidin-4-one of Formula I is reacted with an alkali metal alkoxide and with an N-alkyl-chloropiperidine or a chloroalkylene compound corresponding to one of the formulas

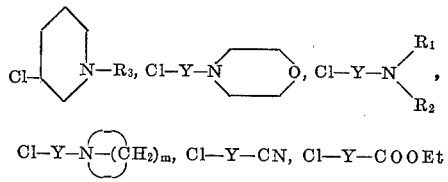

wherein $R_1$, $R_2$ and $R_3$ are lower alkyl groups, Y is a lower alkylene moiety and $m$ is one of the integers 4, 5 or 6. The term "lower alkyl" is used as defined hereinabove. The term "lower alkylene" is used in the present connection to refer to alkylene groups containing 2, 3 or 4 carbon atoms arranged either in a straight chain or in a branched chain in a manner such that the chlorine atom and the other functional group (amino, cyano or carboethoxy group) connected to each other by the alkylene group are separated by at least two carbon atoms. Alternatively, the reaction may be carried out employing the corresponding bromo compounds wherein bromine replaces chlorine in the above formulas.

The reaction conveniently can be carried out in organic diluents such as mixtures of an alcohol and an inert organic solvent such as benzene or toluene. The amounts of the reactants employed are not critical, some of the desired products being obtained when employing any proportion of the reagents. Good results are obtained when substantially equimolar proportions of the reactants are used; however, in the preferred mode of operation, particularly desirable results are obtained when the chloropiperidine or chloroalkylene compound and the alkali metal alkoxide are employed in excess of the 4H-pyrazino(1,2-a)pyrimidin-4-one. When organic diluents are used, it is convenient to carry out the reaction at the reflux temperature of the reaction medium. At such temperatures, reaction takes place smoothly with the production of the free base of the desired product and alkali metal chloride by-product.

In carrying out the reaction, the starting 4H-pyrazino (1,2-a)pyrimidin-4-one is mixed and contacted in any convenient manner with the alkali metal alkoxide. The chloropiperidine or chloroalkylene compound is then added portionwise at the reaction temperature and the resulting mixture maintained at the reaction temperature for a period of time to insure completion of the reaction. Upon completion of the reaction, the mixture can be filtered to remove the by-product alkali metal chloride and any reaction solvent can be removed by distillation to obtain the desired product as a residue. This residue may be further purified by conventional procedures such as washing with dilute aqueous alkali metal hydroxide and solvent extraction. The basic product thus obtained may be treated with a substantially equimolar proportion of a pharmaceutically acceptable mineral acid such as sulfuric, phosphoric, hydrochloric or hydrobromic acid to produce the desired mineral acid salt product.

DESCRIPTION OF THE PREFERRED EMBODIMENTS

The following examples illustrate the invention but are not to be construed as limiting the same.

EXAMPLE 1

47.5 grams (0.5 mole) of aminopyrazine and 118 grams (0.5 mole) of diethyl phenylmalonate were mixed in a vessel suitable for distillation at reduced pressure and equipped with a capillary ebullition tube connected to a source of dry nitrogen. The reaction mixture was heated slowly to 120° C. at which temperature, the aminopyrazine melted, and the mixture became homogeneous. The reaction system was then evacuated to a pressure of substantially 70 millimeters of mercury and the mixture heated to and maintained in the range of 160°–170° C. After 2 hours at this temperature the system was opened and 30 grams (0.13 mole) of diethyl phenylmalonate was added. The pressure was adjusted to 70 millimeters and heating maintained at 160°–170° C. for a second two-hour period after which another addition of 30 grams (0.13 mole) of diethyl phenylmalonate was made in the same manner. Heating at 70 millimeters pressure and 160°–170° C. was continued for a third two-hour period. Ethanol formed during the reaction, distilled out and was collected during the three 2-hour intervals. The solid mass obtained by cooling the reaction mixture was pulverized with a mortar and pestle and washed with ether. The brown solid thus obtained was purified by two recrystallizations from glacial acetic acid to give 2-hydroxy-3-phenyl - 4H - pyrazino(1,2 - a)pyrimidin - 4 - one as a crystalline solid which melted with decomposition at 276° C. The identity of this product was confirmed by quantitative elemental analysis.

EXAMPLE 2

Following substantially the procedure of Example 1, aminopyrazine and diethyl(4-chlorophenyl)malonate were reacted and the product worked up to obtain 2-hydroxy-3 - (4 - chlorophenyl) - 4H - pyrazino(1,2 - a)pyrimidin - 4-one as a crystalline solid which melted with decomposition at 281°–282° C.

EXAMPLE 3

7.2 grams (0.03 mole) of 2 - hydroxy-3-phenyl-4H-pyrazino(1,2-a)pyrimidin-4-one was added in portions during a period of 15 minutes to a sodium ethoxide solution prepared by dissolving 0.92 gram (0.04 mole) of sodium in 250 milliliters of absolute ethanol. This mix- was heated to reflux, and 5.4 grams (0.04 mole) of β-diethylaminoethyl chloride dissolved in 20 milliliters of dry toluene was added dropwise during a 1 hour period to the refluxing mixture. After completion of the addition, the mixture was heated at its reflux temperature for 6 hours and then cooled to room temperature. The reaction mixture was then filtered with suction to remove sodium chloride formed during the reaction and the filtrate concentrated in vacuo to a volume of approximately 75 milliliters. This reduced volume was diluted with 300 milliliters of ice water, treated with 20 milliliters of 10-normal sodium hydroxide solution, and extracted three times with 300-milliliter portions of ether. The combined ether extracts were dried over anhydrous magnesium sulfate and filtered. Treatment of the ethereal solution with gaseous hydrogen bromide precipitated the hydrogen bromide salt of 2-(2-(diethylamino)ethoxy)-3-phenyl-4H-pyrazino(1,2-a)pyrimidin-4 - one which was collected by filtration, washed with dry ether, and recrystallized from ethanol. The product consisted of orange needles which melted at 210°–211° C.

EXAMPLES 4–8

Following substantially the method of Example 3, other 4H-pyrazino(1,2-a)-pyrimidine hydrobromides were prepared by reacting 2-hydroxy-3-phenyl-4H-pyrazino(1,2-a)pyrimidin-4-one and the appropriate chloro compound as named below:

2-(3-diethylaminopropoxy)-3-phenyl - 4H - pyrazino-(1,2-a)-pyrimidin-4-one hydrobromide, melting at 197°–198° C., prepared from 1-chloro-3-diethylaminopropane.

2-(2-dimethylaminoethoxy) - 3 - phenyl-4H-pyrazino-(1,2-a)-pyrimidin-4-one hydrobromide, melting at 200°–201° C., prepared from 1-chloro-2-dimethylaminoethane.

2-(2-(dimethylamino) - 1-methylethoxy)-3-phenyl-4H-pyrazino(1,2-a-pyrimidin-4-one hydrobromide, melting at 193°–195° C., prepared from 1-chloro-2-(dimethylamino)-1-methylethane.

2-(2-(diisopropylamino)ethoxy) - 3 - phenyl-4H-pyrazino(1,2-a)pyrimidin-4-one hydrobromide, melting with decomposition at 197°–198° C., prepared from 1-chloro-2-(diisopropylamino)ethane.

2-(2-(1-pyrrolidinyl)ethoxy) - 3 - phenyl-4H-pyrazino-(1,-2-a)pyrimidin-4-one hydrobromide, melting with decomposition at 188°–190° C., prepared from 1-chloro-2-(1-pyrrolidinyl)ethane.

EXAMPLE 9

7.2 grams (0.03 mole) of 2-hydroxy-3-phenyl-4H-pyrazino(1,2-a)-pyrimidin-4-one and 4.9 grams (0.04 mole) of 1-chloro-3-(dimethylamino)propane were reacted in an ethanolic solution containing 0.04 mole of sodium ethoxide by the exact procedure of Example 3, except that, instead of precipitating the hydrogen bromide salt of the product from the ethereal solution obtained by extraction, the hydrogen chloride salt of 2-(3-(dimethylamino)propoxy - 3 - phenyl - 4H-pyrazino(1,2-a)-pyrimidin-4-one was precipitated by addition to gaseous hydrogen chloride to the said ethereal solution. The product thus obtained melted with decomposition at 213°–214° C.

EXAMPLE 10

The procedure of Example 3 was repeated except that 0.04 mole of 1-(2-chloroethyl)piperidine was employed in place of β-diethylaminoethyl chloride and the reaction mixture was heated for 18 hours after addition of the chloroethylpiperidine. Working up the resulting reaction product as in Example 3 produced the hydrogen bromide salt of 2-(2-piperidinoethoxy)-3-phenyl-4H-pyrazino(1,2-a)pyrimidin-4-one which melted with decomposition at 216°–217° C.

EXAMPLES 11–14

Other substituted 4H-pyrazino(1,2-a)pyrimidine hydrobromides were prepared by reacting 2-hydroxy-3-phenyl-4H-pyrazino(1,2-a)pyrimidin-4-one and the appropriate chloroalkyleneamine following substantially the exact method of Example 10, as follows:

2-(2-morpholinoethoxy) - 3 - phenyl-4H-pyrazino(1,2-a)pyrimidin-4-one hydrobromide, melting with decomposition at 240°–241° C., prepared from N-(2-chloroethyl)morpholine.

2-(3-dimethylamino - 2 - methylpropoxy)-3-phenyl-4H-pyrazino(1,2-a)pyrimidin-4-one hydrobromide, melting at 214°–215° C., prepared from 1-chloro-3-(dimethylamino)-2-methylpropane.

2-(2-(hexahydroazepin - 1 - yl)ethoxy - 3 - phenyl-4H-pyrazin(1,2-a)pyrimidin - 4 - one hydrobromide, melting at 197°–198° C., prepared from N-(2-chloroethyl)hexahydroazepine.

2-((1-ethyl - 3 - piperidinyl)oxy)-3-phenyl-4H-pyrazino(1,2-a)pyrimidin-4-on hydrobromide, melting with decomposition at 220°–221° C., prepared from 3-chloro-1-ethylpiperidine.

EXAMPLE 15

2-hydroxy-3-(4-chlorophenyl) - 4H - pyrazino(1,2-a)pyrimidin-4-one was condensed in separate reactions with N-(2 - chloroethyl)morpholine and 1-chloro-3-(diethylamino)propane employing the procedure and molar proportions of Example 10 to obtain, respectively, 2-(2-morpholinoethoxy)-3-(4-chlorophenyl)-4H - pyrazino(1,2-a)pyrimidin-4-one hydrobromide, which melted with decomposition at 230°–231° C., and 2-(3-diethylaminopropoxy)-3-(4-chlorophenyl) - 4H - pyrazino(1,2 - a)pyrimidin-4-one hydrobromide, which melted at 184°–185° C.

Following the procedures of Examples 3 or 10, other compounds of the present invention are prepared as follows:

2-(4-dimethylaminobutoxy)-3-phenyl - 4H - pyrazino-(1,2-a)pyrimidin-4-one hydrobromide having a molecular weight of 419 by reacting 1-chloro-4-dimethyl-aminobutane with 2-hydroxy-3-phenyl - 4H - pyrazino(1,2-a)pyrimidin-4-one followed by reaction with hydrogen bromide.

2-(3 - (hexahydroazepin-1-yl)propoxy)-3-phenyl - 4H-pyrazino(1,2-a)pyrimidin-4-one hydrobromide having a molecular weight of 459 by reacting 1-chloro-3-(hexahydroazepin-1-yl)propane with 2-hydroxy-3 - phenyl-4H-pyrazino(1,2-a)pyrimidin-4 - one followed by reaction with hydrogen bromide.

2-((1-isopropyl-3-piperidinyl)oxy) - 3 - phenyl-4H-pyrazino(1,2-a)pyrimidin-4-one hydrobromide having a molecular weight of 446 by reacting 3-chloro-1-isopropylpiperidine with 2-hydroxy-3-phenyl - 4H - pyrazino-(1,2-a)pyrimidin-4-one followed by reaction with hydrogen bromide.

2-(2-dibutylaminoethoxy) - 3 - phenyl-4H-pyrazino-(1,2-a)pyrimidin-4-one hydrobromide having a molecular weight of 475 by reacting 1-chloro-2-dibutyl-aminoethane with 2-hydroxy-3-phenyl-4H-pyrazino(1,2 - a)pyrimidin-4-one followed by reaction with hydrogen bromide.

2-((1-butyl-3-piperidinyl)oxy)-3-phenyl - 4H - pyrazino(1,2-a)pyrimidin - 4 - one hydrobromide having a molecular weight of 460 by reacting 3-chloro-1-butyl-piperidine with 2-hydroxy-3-phenyl-4H-pyrazino(1,2 - a) pyrimidin-4 - one followed by reaction with hydrogen bromide.

2 - (3 - (di(1 - methylpropyl)amino)propoxy)-3-(4-chlorophenyl)-4H-pyrazino(1,2-a)pyrimidin-4-one hydrobromide having a molecular weight of 524 by reacting 1-chloro-3-(di(1 - methylpropyl)amino)propane with 2-hydroxy-3-(4-chlorophenyl)-4H-pyrazino(1,2 - a)pyrimidin-4-one followed by reaction with hydrogen bromide.

2-(3 - (morpholino)-1-methylpropoxy)-3-(4 - chlorophenyl)-4H-pyrazino(1,2-a)pyrimidin - 4 - one hydrobromide having a molecular weight of 496 by reacting 3-chloro-1 - (morpholino)butane with 2 - hydroxy-3-(4-chlorophenyl)-4H-pyrazino(1,2 - a)pyrimidin - 4 - one followed by reaction with hydrogen bromide.

2 - (4 - dipropylaminobutoxy)-3-(4-chlorophenyl)-4H-pyrazino(1,2-a)pyrimidin-4-one hydrobromide having a molecular weight of 510 by reacting 1-chloro-4-dipropylaminobutane with 2-hydroxy-3 - (4 - chlorophenyl)-4H-pyrazino(1,2-a)pyramidin - 4 - one followed by reaction with hydrogen bromide.

2-(3-(1-pyrrolidinyl)propoxy) - 3 - (4 - chlorophenyl)-4H-pyrazino(1,2-a)pyrimidin - 4 - one hydrobromide having a molecular weight of 466 by reacting 1-chloro-3-(1-pyrrolidinyl)propane with 2-hydroxy-3-(4-chlorophenyl)-4H-pyrazino(1,2-a)pyrimidin-4-one followed by reaction with hydrogen bromide.

Similarly, following the procedure of Example 5, yet other compounds of the invention are prepared as follows:

2-(3-(diethylamino)-1-methylpropoxy) - 3 - phenyl-4H-pyrazino(1,2-a)pyrimidin-4-one hydrochloride having a molecular weight of 403 by reacting 3-chloro-1-diethylaminobutane with 2-hydroxy-3-phenyl-4H-pyrazino(1,2-a)pyrimidin-4-one followed by reaction with hydrogen chloride.

2-(2-(dimethylamino) - 1,1-dimethylethoxy)-3-phenyl-4H-pyrazino(1,2 - a)pyrimidin-4-one hydrochloride having a molecular weight of 375 by reacting 2-chloro-2-methyl - 1 - dimethylaminopropane with 2 - hydroxy - 3 - phenyl-4H-pyrazino(1,2 - a)pyrimidin-4-one followed by reaction with hydrogen chloride.

2-(3-(diethylamino) - 1 - methylpropoxy)-3-phenyl-4H-pyrazino(1,2-a)pyrimidin-4-one hydrochloride having a molecular weight of 415 by reacting 1-chloro-2-methyl-3-(piperidino)propane with 2-hydroxy-3-phenyl-4H-pyrazino(1,2-a)pyrimidin-4-one followed by reaction with hydrogen chloride.

2-(2-(morpholino) - 1-methylethoxy)-3-phenyl-4H-pyrazino(1,2 - a)pyrimidin - 4 - one hydrochloride having a molecular weight of 403 by reacting 2-chloro-1-(morpholino)propane with 2-hydroxy-3-phenyl-4H-pyrazino-(1,2-a)pyrimidin-4-one followed by reaction with hydrogen chloride.

2-(3-(morpholino) - 2 - methylpropoxy)-3-phenyl-4H-pyrazino(1,2-a)pyrimidin - 4 - one hydrochloride having a molecular weight of 417 by reacting 1-chloro-2-methyl-3-(morpholino)propane with 2 - hydroxy - 3 - phenyl-4H-pyrazino(1,2-a)pyrimidin-4-one followed by reaction with hydrogen chloride.

2-(4-(1-pyrrolidinyl)butoxy) - 3-phenyl-4H-pyrazino(1,2-a)pyrimidin-4-one hydrochloride having a molecular weight of 401 by reacting 1-chloro-4-(1-pyrrolidinyl) butane with 2-hydroxy-3-phenyl - 4H-pyrazino(1,2-a)-pyrimidin-4-one followed by reaction with hydrogen chloride.

2-((1-methyl-3-piperidinyl)-oxy) - 3-(4-chlorophenyl)-4H-pyrazino(1,2-a)pyrimidin-4-one hydrochloride having a molecular weight of 408 by reacting 3chloro-1-methyl-piperidine with 2-hydroxy-3-(4-chlorophenyl)-4H-pyrazino(1,2-a)pyrimidin-4-one followed by reaction with hydrogen chloride.

2 - (3 - (diisopropylamino) - 2-methylpropoxy)-3-(4-chlorophenyl)-4H-pyrazino(1,2-a)pyrimidin-4-one hydrochloride having a molecular weight of 465 by reacting 1-chloro-2-methyl - 3-(diisopropylamino)propane with 2-hydroxy-3-(4-chlorophenyl)-4H - pyrazino(1,2-a)pyrimidin-4-one followed by reaction with hydrogen chloride.

2-(2-dimethylaminoethoxy) - 3 - (4-chlorophenyl)-4H-pyrazino(1,2-a)pyrimidin-4-one hydrochloride having a molecular weight of 381 by reacting 1-chloro-2-dimethyl-aminoethane with 2-hydroxy - 3 - (4-chlorophenyl)-4H-pyrazino(1,2-a)pyrimidin-4-one followed by reaction with hydrogen chloride.

2-(2 - (piperidino) - 1 - methylethoxy)-3-(4-chlorophenyl) - 4H-pyrazino(1,2-a)pyrimidin-4-one hydrochloride having a molecular weight of 435 by reacting 2-chloro-1-(piperidino)propane with 2-hydroxy-3-(4-chlorophenyl)-4H-pyrazino(1,2-a)pyrimidin-4-one followed by reaction with drydogen chloride.

EXAMPLES 16–18

5.5 grams (0.24 mole) of sodium metal was dissolved in 1.2 liters of anhydrous ethanol. To the resulting ethanolic solution of sodium ethoxide 43.02 grams (0.18 mole) of 2-hydroxy-3-phenyl-4H-pyrazino(1,2-a)pyrimidin-4-one was added with stirring and the resulting mixture was stirred and heated under reflux for 2.5 hours. Immediately thereafter ethyl 3-bromopropionate was added dropwise to the refluxing reaction mixture to provide a total of 32.6 grams (0.18 mole) of ethyl 3-bromopropionate added over a period of 45 minutes. Heating of the reaction mixture at the reflux temperature with stirring was continued for a period of 20 hours. Thereafter the mixture was cooled to room temperature and the ethanol removed by evaporation under vacuum leaving the crude product as a residue. The latter was dispersed in 400 milliliters of water, made alkaline by addition of 100 milliliters of 10-molar sodium hydroxide solution and the resulting mixture successively extracted seven times with 250-milliliter portions of diethyl ether. The extracts were combined, washed with water and dried. The ether was then distilled off leaving the product as a yellow, oily residue. The latter was dissolved in isopropanol and the solution cooled to crystallize the product, the ethyl ester of 3-((4-oxo-3-phenyl-4H-pyrazino-(1,2-a)pyrimidin-2-yl)oxy)propionic acid, in the form of orange crystals having a melting point of 124.5°–125.5° C. Elemental analysis for carbon, hydrogen and nitrogen confirmed the identity of the product.

In exactly similar fashion, 10.8 grams (0.045 mole) of 2 - hydroxy - 2 - phenyl-4H-pyrazino(1,2-a)pyrimidin-4-one was reacted with 10.9 grams (0.06 mole) of ethyl 2-bromopropionate in 500 milliliters of an ethanolic solution containing 0.06 mole of sodium ethoxide and the product worked up and recrystallized from isopropanol to obtain the ethyl ester of 2-((4-oxo-3-phenyl-4H-pyrazino(1,2-a)pyrimidin - 2 - yl)oxy)propionic acid in the form of yellow needlelike crystals melting at 120°–121° C.

The foregoing was repeated employing 12.3 grams (0.06 mole) of ethyl 2-bromobutyrate in place of the 2-bromopropionate above to obtain the ethyl ester of 2-((4-oxo-3-phenyl - 4H - pyrazino(1,2-a)pyrimidin-2-yl)oxy) butyric acid in the form of orange-yellow crystals, melting at 127°–128° C.

EXAMPLE 19

47.8 grams (0.2 mole) of 2-hydroxy-3-phenyl-4H-pyrazino(1,2-a)pyrimidin-4-one and 26 grams (0.19 mole) of anhydrous potassium carbonate are dispersed in 95 milliliters of methyl ethyl ketone and the resulting mixture stirred and heated to reflux. To the refluxing mixture a solution of 0.2 mole of bromoacetonitrile in methyl ethyl ketone is added dropwise over a period of 1.5 hours. The reaction mixture is then heated at reflux temperature for an additional 1.5 hours and the product worked up as in Example 16 except that the crystalline product is obtained directly by evaporation of the ether extract. The (4 - oxo-3-phenyl - 4H - pyrazino(1,2-a)pyrimidin-2-yl) acetonitrile product is obtained as a yellow, crystalline solid melting at 164°–165° C.

The products of the present invention are useful as agents active in the central nervous system of animals.

In a representative operation various series of 4 groups of mice consisting of four mice per group were injected intraperitoneally with an aqueous dispersion of a compound of the present invention with each group receiving a different dose level of test compound selected by the method of Horn (Biometrics, vol. 12, p. 311 (1956)). Each series of groups received only one test compound. Another group of mice of the same age and heredity was retained untreated to serve as checks. Three hours after the foregoing injections all the mice were injected subcutaneously with a solution of reserpine at a dosage of one milligram per kilogram of body weight. This dosage of reserpine causes depression in the otherwise untreated mice, a readily observable symptom of such depression being a drooping or closing of the eyelids known as ptosis. As soon after the injections of reserpine as the check mice showed complete ptosis, observations were made as to the number of mice showing complete ptosis in each of the groups pretreated with a compound of the invention. From the observed values the dosage ($ED_{50}$) in milligrams per kilogram effective for inhibiting reserpine depression in fifty percent of the treated mice was determined employing the tables of Horn (op. cit., supra). Representative results obtained were as follows:

| Compound Substituents in Formula II | | | | Reserpine |
|---|---|---|---|---|
| R | Z | n | X | inhibition |
| $(CH_3)_2NCH_2CH_2(CH_3)O$ | H | 1 | Br | 17.8 |
| $\begin{array}{c}CH_2\!-\!CH_2\\ \diagdown\\ \phantom{CH_2\!-\!}NCH_2CH_2O\\ \diagup\\ CH_2\!-\!CH_2\end{array}$ | H | 1 | Br | 10.0 |
| $\begin{array}{c}\phantom{O}CH_2\!-\!CH_2\\ \diagup\phantom{CH_2}\diagdown\\ O\phantom{CH_2\!-\!CH_2}NCH_2CH_2O\\ \diagdown\phantom{CH_2}\diagup\\ \phantom{O}CH_2\!-\!CH_2\end{array}$ | H | 1 | Br | 7.7 |
| $(C_2H_5)_2NCH_2CH_2CH_2O$ | Cl | 1 | Br | 31.6 |

In a further representative operation demonstrating the central nervous system activity of these compounds, mice were treated with 100 milligrams per kilogram of hexobarbital and representative 4H-pyrazino(1,2-a)-pyrimidin-4-ones in dosages of from 30 to about 200 milligrams per kilogram, depending on the particular compound used. The sleeping time induced by hexobarbital was prolonged from two to six times as long as control mice which received only hexobarbital.

In a third procedure several mice pre-conditioned to an incubator maintained at constant temperature were administered one of the compounds of this invention followed in 30 minutes by an intraperitoneal dose of 4 milligrams per kilogram of d-amphetamine. The mice were then grouped in small cages and returned to the incubator. A significantly higher number of mice were killed by this procedure than by similar treatment with d-amphetamine alone, demonstrating that these compounds potentiate the effects of d-amphetamine.

The activity demonstrated by the above procedure is known to be characteristic of compounds classified as having antidepressant activity. They are thus useful as antidepressants in animals and as a laboratory tool for studying the central nervous system effects of various other agents in laboratory animals.

The reactants aminopyrazine and diethyl phenylmalonate to be employed as starting materials according to the teaching of this invention are available commercially. The substituted diethyl phenylmalonates may be prepared by various methods reported in the literature. Conveniently, they may be prepared from the corresponding substituted phenylacetonitrile by condensation with diethyl oxalate in the presence of a strong base, followed by hydrolysis in aqueous alkali, esterification with ethanol, and decarbonylation. It will be apparent that other dialkyl malonates can be substituted for the diethyl malonates above.

The chloroalkylene compounds employed as reactants are in some instances available commercially as the hydrochloride salts, or they can be prepared as their hydrochloride salts by methods known in the literature. In one such method, the desired chloroalkylene compounds in the form of their hydrochlorides are prepared from the corresponding aminoalcohols by treating the latter with thionyl chloride in a halogenated hydrocarbon solvent such as chloroform. The free base form of the chloroalkylene compound, useful in the practice of the present invention, is obtained by treatment of the hydrochloride salt with a concentrated aqueous alkali metal hydroxide solution, followed by distillation to separate the free chloroalkylene compound.

The N-alkyl-chloropiperidines employed as starting materials can be prepared by reaction of thionyl chloride as set forth above with an N-alkyl-hydroxypiperidine while the latter may be prepared by the method shown in U.S. Pat. 2,802,007.

What is claimed is:

1. A 4H-pyrazino(1,2-a)pyrimidin-4-one of one of the formulae

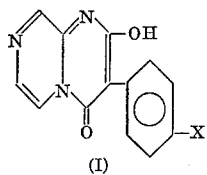

(I)

and

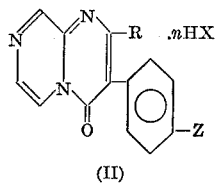

(II)

wherein X is chlorine or bromine, $n$ is zero or one, Z is hydrogen or chlorine, and R is N-(lower alkyl)-3-piperidoxy, morpholino-lower-alkoxy, di(lower alkyl)-amino-lower-alkoxy or N-(azacycloalkyl)lower-alkoxy.

2. The compound of claim 1 which is 2-hydroxy-3-phenyl-4H-pyrazino(1,2-a)pyrimidin-4-one.

3. The compound of claim 1 which is 2-hydroxy-3-(4-chlorophenyl) - 4H - pyrazino(1,2-a)pyrimidin-4-one.

4. The compound of claim 1 which is 2-(2-(piperidino) ethoxy) - 3 - phenyl - 4H - pyrazino(1,2-a)pyrimidin-4-one hydrobromide.

5. The compound of claim 1 which is 2-(2-morpholino)ethoxy) - 3 - phenyl - 4H-pyrazino(1,2-a)pyrimidin-4-one hydrobromide.

6. The compound of claim 1 which is 2-(2-morpholino-ethoxy) - 3 - (4 - chlorophenyl) - 4H - pyrazino(1,2-a) pyrimidin-4-one hydrobromide.

7. The compound of claim 1 which is 2-(2-(1-pyrrolidinyl)ethoxy) - 3 - phenyl - 4H - pyrazino(1,2-a)pyrimidin-4-one hydrobromide.

References Cited

UNITED STATES PATENTS 2,057,978  10/1936  Reitmann _____ 260—256.4

ALEX MAZEL, Primary Examiner

R. J. GALLAGHER, Assistant Examiner

U.S. Cl. X.R.

260—239, 247, 256.4, 293, 326.8, 405.7, 475, 487, 583;
424—248, 251